United States Patent
Sasaki et al.

(10) Patent No.: US 6,447,589 B2
(45) Date of Patent: Sep. 10, 2002

(54) METHOD OF PRODUCING A WATER-BASE RESIN COMPOSITION FOR RUST-PREVENTIVE COATING

(75) Inventors: Motohiro Sasaki, Kawasaki; Toshiaki Shimakura, Ichikawa; Katsuyoshi Yamasoe, Sakura, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/734,766

(22) Filed: Dec. 13, 2000

(30) Foreign Application Priority Data

Dec. 13, 1999 (JP) ............................................. 11-352978

(51) Int. Cl.⁷ ............................ C03F 11/173; C04B 9/02
(52) U.S. Cl. .............................. 106/14.05; 106/14.14; 523/401; 523/402; 524/492; 524/556; 524/589; 524/591; 524/601; 524/804; 524/832; 524/837; 524/839; 524/907
(58) Field of Search ................................. 524/492, 556, 524/589, 591, 601, 804, 832, 837, 839, 858, 907; 523/401, 402; 106/14.05, 14.44

(56) References Cited

U.S. PATENT DOCUMENTS 4,330,446 A * 5/1982 Miyosawa
4,407,899 A * 10/1983 Hara et al.

FOREIGN PATENT DOCUMENTS

| EP | 0 648 823 A1 | 4/1995 |
|---|---|---|
| EP | 687 715 A2 * | 12/1995 |
| JP | 55062972 | 5/1980 |
| JP | 55062973 | 5/1980 |
| JP | 55099976 | 7/1980 |
| JP | 63-242383 A * | 10/1988 |
| JP | 07-037030 A * | 2/1995 |
| WO | WO99/46342 | 9/1999 |

* cited by examiner

*Primary Examiner*—Robert Dawson
*Assistant Examiner*—Marc S Zimmer
(74) *Attorney, Agent, or Firm*—Connolly Bove Lodge & Hutz LLP

(57) ABSTRACT

The present invention has for its object to provide a method of producing a water-base resin composition for rust-preventive coating which is suited for metal-coated steel panels, particularly galvanized steel panels, and despite the absence of chromium therein, is capable of imparting high corrosion resistance to coated metals, with the additional advantage of improved storage stability, and to a water-base resin composition as obtained by the above production method. The production technology according to the present invention is a method of producing a water-base resin composition for rust-preventive coating which comprises reacting a water-base resin composition containing, in each liter thereof, 10 to 500 g of water-dispersible silica and 0.02 to 20 g of a silane coupling agent and/or a hydrolytic condensation product thereof at a temperature of not less than 50° C. and not over the boiling temperature thereof, and the water-base resin composition as obtainable by the above production method.

20 Claims, No Drawings

METHOD OF PRODUCING A WATER-BASE RESIN COMPOSITION FOR RUST-PREVENTIVE COATING

FIELD OF THE INVENTION

The present invention relates to a method of producing a water-base resin composition for the non-chromate rust-preventive coating of metallic substrates, particularly for galvanized steel panels.

PRIOR ART

As the metallic surface treating agent, a chromium-containing surface treating agent such as a chromate system or a phosphate-chromate system has heretofore been used broadly and still in use today. However, in view of the recent trend toward more stringent regulatory control for environmental protection, it is likely that the use of such coating systems will be restricted for fear of the toxicity, particularly carcinogenicity, of chromium. Therefore, development of a rust-preventing agent not containing chromium and yet as effective as the chromium-containing treating agent in imparting corrosion resistance has been awaited. As disclosed in Japanese Kokai Publication Hei-11-29724, the inventors of the present invention previously developed a nonchromate rust-preventing agent comprising a water-base resin and, as incorporated therein, a thiocarbonyl group-containing compound, a phosphate ion, and water-dispersible silica. Regrettably, however, this system was found to be deficient in storage stability and somewhat poor in corrosion resistance at thin coating thickness, although it provides corrosion resistance equivalent to that afforded by a chromium-containing treating agent.

Meanwhile, with regard to the use of silane coupling agents in surface treating agents, an acidic surface treating agent containing two dissimilar silane coupling agents is disclosed in Japanese Kokai Publication Hei-8-73775. However, this system is intended to improve finger-print resistance and coating adhesion and is quite deficient in corrosion resistance for use in applications where high corrosion resistance is required after application of a rust-preventing agent as in the present invention.

Moreover, Japanese Kokai Publication Hei-10-60315 discloses a steel structure surface treating agent containing a silane coupling agent having a certain functional group reactive with an aqueous emulsion but the corrosion resistance required here is only that of a degree satisfying comparatively mild test requirements such as those of a wet test and as far as corrosion resistance is concerned, the system is a far cry from a rust-preventing agent meeting the highly critical corrosion resistance requirements, such as those of a salt spray test at thin film thicknesses, as provided by the present invention. With the above state of the art by way of background, there has been a standing demand for development of a nonchromate rust-preventing agent expressing sufficient corrosion resistance at thin coating thickness.

SUMMARY OF THE INVENTION

The present invention has for its object to provide a method of producing a water-base resin composition for rust-preventive coating which is suited for metal-coated steel panels, particularly galvanized steel panels, and despite the absence of chromium therein, is capable of imparting high corrosion resistance to coated metals, with the additional advantage of improved storage stability, and to a water-base resin composition as obtained by the above production method.

The production technology according to the present invention is a method of producing a water-base resin composition for rust-preventive coating which comprises reacting a water-base resin composition containing, in each liter thereof, 10 to 500 g of water-dispersible silica and 0.02 to 20 g of a silane coupling agent and/or a hydrolytic condensation product thereof at a temperature of not less than 50° C. and not over the boiling temperature thereof. The water-dispersible silica mentioned above is preferably one member or a mixture of two or more members selected from the group consisting of spherical silica, chainlike silica and aluminum-modified silica.

The water-base resin composition according to the present invention is a water-base resin composition for rust-preventive coating as obtainable by the above production method.

DETAILED DESCRIPTION OF THE INVENTION

In the present invention, the water-base resin composition contains water, which serves as a solvent, and a water-base resin. The water-base resin includes not only water-soluble resins but also resins which are intrinsically insoluble in water but are provided as finely dispersed in water, for example as emulsions or suspensions. The resin usable as such water-base resin includes polyolefin resin, polyurethane resin, acrylic resin, polycarbonate resin, epoxy resin, polyester resin, alkyd resin, phenol resin, and other thermosetting resins, and these can be used as a suitable mixture. The more preferred are crosslinkable resins which have functional groups, such as either carboxyl or hydroxyl, or both. Particularly preferred is a polyolefin resin, a polyurethane resin or a system comprising those two kinds of resins.

In the water-base resin composition of the invention, the water-base resin accounts for 1 to 80 weight parts, in terms of nonvolatile matter, and water accounts for 99 to 20 weight parts, in each 100 weight parts of the water-base resin and water combined. If the proportion of resin solids is less than 1 weight part, the corrosion resistance and top coat adhesion will not be sufficient. On the other hand, if the proportion exceeds 80 weight parts, the composition will be liable to undergo the undesirable gelation.

In the production method of the invention, a silane coupling agent and/or a hydrolytic condensation product thereof is used as the silane compound. The hydrolytic condensation product of a silane coupling agent means an oligomer obtainable by hydrolytic polymerization of the silane coupling agent.

The silane coupling agent which can be used as above in the present invention is not particularly restricted but includes the following, among others: vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3-(triethoxysilyl)-1-propanamine, N,N'-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltriethoxysilane, γ-glycidoxypropyltrimethoxysilane, γ-glycidoxypropyltriethoxysilane, γ-glycidoxypropylmethyldimethoxysilane, 2-(3,4-epoxycyclohexyl)ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane and N-[2-(vinylbenzylamino)ethyl]-3- aminopropyltrimethoxysilane.

The particularly preferred silane coupling agent includes vinylmethoxysilane, vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3-(triethoxysilyl)-1-propanamine and N,N'-bis[3-(trimethoxysilyl)propyl]ethylenediamine. These silane coupling agents can be used each alone or in a suitable combination.

In the present invention, said silane compound is used in an amount of 0.02 to 20 g (silica solids: ca 0.04 to 40 wt. %), preferably 0.1 to 2.5 g (silica solids: ca 0.2 to 5 wt. %), in each liter of the water-base resin composition. If the amount of the silane compound is less than 0.02 g, the contribution to corrosion resistance and top coat adhesion will be insufficient. On the other hand, if the limit of 20 g is exceeded, the shelf-life of the composition will be sacrificed.

In the method of producing a water-base resin composition according to the invention, water-dispersible silica is further employed. The water-dispersible silica which can be used is not particularly restricted but is preferably a spherical silica, chainlike silica or aluminum-modified silica which is weakly basic and lean in sodium and other impurities. The spherical silica includes colloidal silicas such as "Snowtex N", "Snowtex UP" (both manufactured by Nissan Chemical) and fumed silicas such as "Aerosil" (Japan Aerosil); the chainlike silica includes silica gels such as "Snowtex PS" (Nissan Chemical); and the aluminum-modified silica includes "Adelite AT-20A" (Asahi Denka), for instance.

In the method of producing a resin composition of the invention, said water-dispersible silica is added at the amount of 10 to 500 g per liter of the water-base resin composition. If the amount of water-dispersible silica is less than 10 g, its contribution to corrosion resistance will not be sufficient. Over 500 g, the enhancement of corrosion resistance will reach a saturation point and an economic disadvantage will result.

In the method of producing a resin composition according to the invention, a solvent can be used for improving the film-forming properties of the resin to thereby yield a more uniform, smooth film. The solvent mentioned just above is not particularly restricted only if it is selected from among the solvents in routine use in coatings, thus including solvents in the alcohol series, ketone series, ester series and ether series, for instance.

Production of the water-base resin composition for rust-preventive coating according to the present invention can be carried out typically in the following manner. A reactor is charged with said water-base resin, solvent and water-dispersible silica and the mixture is heated to a temperature not less than 50° C., preferably not less than 60° C., but not more than the boiling temperature of the resin composition while it is constantly stirred. Then, a predetermined amount of said silane coupling agent is added dropwise over 1 to 8 hours while the system is stirred at the same temperature. On completion of the reaction, the product is cooled and, where necessary, adjusted with water or a solvent to a predetermined solid content, whereby the water-base resin composition of the invention is obtained.

In the production method of the invention, if the above reaction temperature is below 50° C., the reaction between the silane compound and the water-base resin and/or water-dispersible silica will not proceed far enough so that the effect of the invention may not be obtained. On the other hand, if the reaction temperature reaches or exceeds the boiling temperature of the composition, the evaporation of water will be undesirably too vigorous. The reaction time need is 1 to 8 hours, and a predetermined amount of said silane compound is added within this time period at a rate of 0.1 g/min to 10 g/min. After completion of dropwise addition, the reaction is further continued for about 2 hours. Usually the reaction conditions may be 3 to 5 hours at 80° C. The water-base resin composition for rust-preventive coating of the present invention can be used, either as it is or in combination with one or more other kinds of rust-preventing agents as a rust-preventive coating agent for metals.

By using the water-base resin composition for rust-preventive coating of the invention as a nonchromate rust-preventing agent, galvanized steel panels can be provided with a high degree of corrosion resistance exceeding that afforded by the conventional chromate-containing rust-preventing agent. Furthermore, as demonstrated, this water-base resin composition for rust-preventive coating has a good shelf-life. Thus, it is supposed that as the water-base resin, water-dispersible silica and silane coupling agent are mixed together and heated in the method of the invention, the silane coupling agent reacts with the water-base resin and, further, with the silica to enhance the density of crosslinks, with the result that both corrosion resistance and top coat adhesion are improved. Furthermore, as the unreacted silane coupling agent is eliminated, the shelf-life of this water-base resin composition for rust-preventive coating is dramatically increased.

BEST MODE FOR CARRYING OUT THE INVENTION

The following examples illustrate the present invention in further detail without defining the scope of the invention.

EXAMPLE 1

A reactor equipped with a drip funnel, thermometer, heating means and stirrer was charged with 513 g of the aqueous olefin resin PC2200 (Showei Kagaku), 231 g of the water-dispersible silica "Snowtex N" (Nissan Chemical) and 256 g of pure water and, while the mixture was stirred, the temperature was increased to 80° C. Then, under constant stirring, 1.4 g of "KBM-403" (3-glycidoxypropyltrimethoxysilane, Shin-Etsu Chemical) was added dropwise at a rate of 0.1 g/min and the mixture was further heated for 3 hours. The reaction mixture was then cooled to below 40° C. to provide a water-base resin composition for rust-preventive coating with a resin solid content of 20%. The commercial zinc-electroplated steel panel EG-MO (Japan Test Panel Co.; 70 mm×150 mm×0.8 mm) was spray-degreased with the commercial alkali degreasing agent "Surf Cleaner 53S" (Nippon Paint) at 60° C. for 2 minutes, then it was washed with water and dried. Using a #3 bar coater, this degreased steel panel was coated with the above water-base resin composition for rust-preventive coating in a dry film thickness equivalent to 1 g/m$^2$ and the coat was baked to dry at an ultimate panel temperature of 150° C. The steel panel thus treated with the water-base resin composition for rust-preventive coating was evaluated for primary corrosion resistance and top coat adhesion and the shelf-life of the water-base resin composition was also evaluated. The evaluations were made by and according to the methods and criteria described hereinafter. The results are shown in Table 1.

EXAMPLES 2 TO 7 AND COMPARATIVE EXAMPLES 1 TO 3

Except that the species of water-base resin, concentration of Snowtex N, species and concentration of silane coupling agent, and reaction temperature were varied as shown in Table 1, the procedure of Example 1 was otherwise repeated to provide water-base resin composition for rust-preventive coating. Using each of these water-base resin composition for rust-preventive coating, surface-conditioned steel panels were prepared as in Example 1 and these surface-conditioned steel panels and the water-base resin composition for rust-preventive coating used were evaluated as in Example 1. The results are shown in Table 1.

COMPARATIVE EXAMPLE 4

The commercial zinc-electroplated steel panel EG-MO was dipped in "Surf Zinc 1000" (Nippon Paint, reactive chromating bath composition) at 60° C. for 10 seconds to deposit the chromate in a dry thickness of 50 mg/m$^2$ equivalent, squeezed by roll-pressing and dried at 70° C. for 20 seconds. Otherwise, the procedure of Example 1 was repeated to give a surface-conditioned steel panel. The surface-conditioned steel panel and the treating agent used were evaluated as in Example 1. The results are shown in Table 1.

| | Resin species (blending ratio) | ST-N (g) | Silane coupling agent Species | (g) | Heating temp. (° C.) | Primary corrosion resistance (SST resistance) Flat area | Er cup |
|---|---|---|---|---|---|---|---|
| Ex. | | | | | | | |
| 1 | Polyolefin | 231 | 3-Grycidoxy-propyltrimethoxysilane | 1.4 | 80 | 10 | 10 |
| 2 | Polyolefin/polyurethane(1/1) | 15 | 3-Aminopropyl-propyltriethoxysilane | 18 | 55 | 10 | 10 |
| 3 | Polyolefin/acrylic-2 (2/1) | 400 | 3-Grycidoxy-propyltrimethoxysilane | 0.04 | 95 | 10 | 10 |
| 4 | Polyolefin/polyurethane/polyester (1/1/1) | 230 | N-(1,3-dimethoxybutylidene)-3-(triethoxysilyl)-1-propaneamine | 0.7 | 80 | 10 | 10 |
| 5 | Epoxy | 230 | 3-Mercapto-propyltrimethaxysilane | 1.4 | 80 | 10 | 10 |
| 6 | Acrylic-2 | 30 | 3-Grycidoxy-propylmethyldimethoxysilane | 1.4 | 80 | 10 | 10 |
| 7 | Polycarbonate | 180 | Vinylmethoxysilane | 1.4 | 80 | 10 | 9 |
| Compar. Ex. | | | | | | | |
| 1 | Polyolefin | 600 | Vinylmethoxysilane | 25 | 80 | 4 | 3 |
| 2 | Polyolefin/acrylic-1 (1/1) | 5 | 3-Grycidoxy-propyltrimethoxysilane | 0.01 | 80 | 3 | 2 |
| 3 | Polyolefin | 230 | 3-Grycidoxy-propyltrimethoxysilane | 1.4 | 25 | 4 | 3 |
| 4 | | | Reactive chromating bath | | | 7 | 4 |

| | Top coat adhesion Primary | | | Secondary | | | |
|---|---|---|---|---|---|---|---|
| | Cross-cut | Er | Cross-cut + Er | Cross-cut | Er | Cross-Cut + Er | Shelf-life |
| Ex. | | | | | | | |
| 1 | 10 | 10 | 10 | 10 | 10 | 10 | ○ |
| 2 | 10 | 10 | 10 | 10 | 10 | 9 | ○ |
| 3 | 10 | 10 | 10 | 10 | 10 | 10 | ○ |
| 4 | 10 | 10 | 10 | 10 | 10 | 10 | ○ |
| 5 | 10 | 10 | 10 | 10 | 10 | 10 | ○ |
| 6 | 10 | 10 | 10 | 10 | 10 | 10 | ○ |
| 7 | 10 | 10 | 10 | 10 | 10 | 10 | ○ |
| Compar. Ex. | | | | | | | |
| 1 | 10 | 9 | 9 | 4 | 4 | 3 | X |
| 2 | 10 | 9 | 9 | 4 | 4 | 2 | ○ |
| 3 | 10 | 9 | 9 | 2 | 2 | 2 | X |
| 4 | 10 | 10 | 10 | 6 | 4 | 2 | ○ |

Note 1: ST-N: Snowtex N (Nissan chemical)
Note 2: Er: Erichsen 7 mm cupping test As the water-dispersible silica and resin indicated in Table 1, the following commercial products were used.

Water-dispersible silica: Snowtex (Nissan Chemical; spherical colloidal silica)
Polyolefin resin: PC2200 (Showei Kagaku)
Polyurethane resin: Bontiter HUX-320 (Asahi Denka)
Acrylic resin-1: Kanevinol AD121 (Japan NSC)
Acrylic resin-2: EM1120 (Nippon Paint)
Epoxy resin: Polyzol 8500 (Showa High Polymer)
Polyester resin: Pesresin A-124G (Takamatsu Oils and Fats)
Polycarbonate resin: Superflex F-8124D (Daiichi Kogyo Seiyaku)

Methods of Evaluation

In the above Examples 1 to 7 and Comparative Examples 1 to 4, primary corrosion resistance, top coat adhesion and storage stability were evaluated according to the following procedures and rating schedules.

Primary Corrosion Resistance

The evaluation was made by the salt pray test in which the substrate surface was sprayed with 5% NaCl solution at 35° C. and the degree of white rust formation after 120 hours was rated on a 10-point scale. The evaluation was made in both the flat area and the Erichsen 7 mm cupped area.

The following rating scale was used.

10 points: no abnormality
9 points: slight white rust
8 to 6 points: intermediate between 9 and 5 points
5 points: white rust formed over one-half of the whole area
4 to 2 points: intermediate between 5 points and 1 point
1 point: white rust formed over the whole area Top Coat Adhesion a) Preparation of testpieces The commercial zinc-electroplated steel panel EG-MO was spray-degreased with "Surf Cleaner 53S" (Nippon Paint; alkali degreasing agent) at 60° C. for 2 minutes, after which it was rinsed with water and dried at 80° C. Using a #3 bar coater, the water-base resin composition for rust-preventive coating of the invention was coated on the above sheet in a dry film thickness of 1 g/m$^2$ equivalent and dried at an ultimate sheet temperature of 150° C. Then, using a #32 bar coater, "Super Lac 100" (Nippon Paint; acrylic-melamine coating) was coated in a dry film thickness of 20 $\mu$m and dried at 150° C. for 20 minutes to provide a top coat adhesion testpiece.

b) Primary adhesion test

Cross-cut test: An adhesive tape was affixed onto the 100 squares, at a 1 mm pitch, as formed by cross-cutting the testpiece. The tape was then peeled off and the peeling resistance was evaluated on the following 10-point rating scale.

Erichsen 7 mm test: To the cupped area of the testpiece as formed at a stroke of 7 mm in the Erichsen cupping test, a tape was affixed and the peelability was evaluated in the same manner. Cross-cut +Erichsen 7 mm test: The part of the testpiece which was cross-cut to make 100 squares at a 1 mm pitch was cupped by 7 mm with an Erichsen tester. An adhesive tape was affixed to the cupped area and the peeling resistance was evaluated in the same manner as above.

The following rating scale was used.

10 points: no peeling
9 points: residual coat fraction >90%
8 points: residual coat fraction >80%
7 points: residual coat fraction >70%
6 points: residual coat fraction >60%
5 points: residual coat fraction >50%
4 points: residual coat fraction >40%
3 points: residual coat fraction >30%
2 points: residual coat fraction >20%
1 point: residual coat fraction >10%
0 point: residual coat fraction <10% c) Secondary adhesion test

The testpiece was immersed in boiling water for 30 minutes and then tested using the same test and evaluation protocols as in the primary adhesion test.

Shelf-life

The water-base resin composition for rust-preventive coating was stored in an incubator at 40° C. for 3 months and, then, evaluated for the degree of gelation or precipitation according to the following evaluation schedule.

o: no gels or precipitates formed
x: gels or precipitates formed

It will be apparent from Table 1 that the water-base resin composition for rust-preventive coating obtained by the method of the invention is not only capable of imparting excellent corrosion resistance to metals but also has a long shelf-life.

What is claimed is:

1. A method of producing a water-base resin composition for rust-preventive coating which comprises
   heating a mixture of a water-base resin, a solvent and a water-dispersible silica to a temperature of not less than 50° C. but not over the boiling temperature of the resin composition, and
   adding a silane coupling agent and/or a hydrolytic condensation product of the silane coupling agent to the mixture at the same temperature,
   said water-dispersible silica accounting for 10 to 500 g in each liter of said water-base resin composition, and
   said silane coupling agent and/or said hydrolytic condensation product of the silane coupling agent accounting for 0.02 to 20 g in each liter of said water-base resin composition.

2. The production method according to claim 1 wherein said water-dispersible silica is one member or a mixture of two or more members selected from the group consisting of spherical silica, chainlike silica and aluminum-modified silica.

3. A water-base resin composition for rust-preventive coating as obtainable by the production method according to claim 1.

4. A water-base resin composition for rust-preventive coating as obtainable by the production method according to claim 2.

5. The production method of claim 1 wherein said water-base resin is a thermosetting resin.

6. The production method of claim 1 wherein said water-base resin is at least one member selected from the group consisting of polyolefin resin, polyurethane resin, acrylic resin, alkyd resin and phenol resin.

7. The production method of claim 6 wherein said water-base resin has carboxyl groups or hydroxyl groups or both and is crosslinkable.

8. The production method of claim 1 wherein said water-base resin is a polyolefin resin or a polyurethane resin or mixtures thereof.

9. The production method of claim 1 wherein said silane coupling agent is at least one member selected from the group consisting of vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N- (1,3-dimethylbutylidene)-3-(triethoxysilyl)-1-propanamine, N,N'-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltrimethoxysilane, γ-glycidoxypropyltrimethoxysilane, γ-glycidoxypropyltriethoxysilane, γ-glycidoxypropylmethyldimethoxysilane, 2(3,4-epoxycyclohexyl)ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane and N-[2-(vinylbenzylamino)ethyl]-3-aminopropyltrimethoxysilane.

10. The production method of claim 1 wherein said silane coupling agent is at least one member selected from the group consisting of vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3(triethoxysilyl)-1-propanamine and N,N'-bis[3-(trimethoxysilyl)propyl]ethylenediamine.

11. The production method of claim 2 wherein said water-base resin is a thermosetting resin.

12. The production method of claim 2 wherein said water-base resin is at least one member selected from the group consisting of polyolefin resin, polyurethane resin, acrylic resin, alkyd resin and phenol resin.

13. The production method of claim 2 wherein said water-base resin has carboxyl groups or hydroxyl groups or both and is crosslinkable.

14. The production method of claim 2 wherein said water-base resin is a polyolefin resin or a polyurethane resin or mixtures thereof.

15. The production method of claim 2 wherein said silane coupling agent is at least one member selected from the group consisting of vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N- (1,3-dimethylbutylidene)-3-(triethoxysilyl)-1-propanamine, N,N'-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltrimethoxysilane, γ-glycidoxypropyltrimethoxysilane, γ-glycidoxypropyltriethoxysilane, γ-glycidoxypropylmethyldimethoxysilane, 2(3,4-epoxycyclohexyl)ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane and N-[2-(vinylbenzylamino)ethyl]-3-aminopropyltrimethoxysilane.

16. The production method of claim 2 wherein said silane coupling agent is at least one member selected from the group consisting of vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3(triethoxysilyl)-1-propanamine and N,N'-bis[3-(trimethoxysilyl)propyl]ethylenediamine.

17. The production method of claim 6 wherein said silane coupling agent is at least one member selected from the group consisting of vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N- (1,3-dimethylbutylidene)-3-(triethoxysilyl)-1-propanamine, N,N'-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltrimethoxysilane, γ-glycidoxypropyltrimethoxysilane, γ-glycidoxypropyltriethoxysilane, γ-glycidoxypropylmethyldimethoxysilane, 2(3,4-epoxycyclohexyl)ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane and N-[2-(vinylbenzylamino)ethyl]-3-aminopropyltrimethoxysilane.

18. The production method of claim 6 wherein said silane coupling agent is at least one member selected from the group consisting of vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3(triethoxysilyl)-1-propanamine and N,N'-bis[3-(trimethoxysilyl)propyl]ethylenediamine.

19. The production method of claim 12 wherein said silane coupling agent is at least one member selected from the group consisting of vinylmethoxysilane, vinyltrimethoxysilane, vinylethoxysilane, vinyltriethoxysilane, 3-aminopropyltriethoxysilane, 3-glycidoxypropyltrimethoxysilane, 3-methacryloxypropyltrimethoxysilane, 3-mercaptopropyltrimethoxysilane, N- (1,3-dimethylbutylidene)-3-(triethoxysilyl)-1-propanamine, N,N'-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-aminopropyltrimethoxysilane, γ-aminopropyltrimethoxysilane, γ-glycidoxypropyltrimethoxysilane, γ-glycidoxypropyltriethoxysilane, γ-glycidoxypropylmethyldimethoxysilane, 2(3,4-epoxycyclohexyl)ethyltrimethoxysilane, γ-methacryloxypropyltrimethoxysilane,
γ-methacryloxypropyltriethoxysilane,
γ-mercaptopropyltrimethoxysilane,
γ-mercaptopropyltriethoxysilane and N-[2-(vinylbenzylamino)ethyl]-3-aminopropyltrimethoxysilane.

20. The production method of claim 12 wherein said silane coupling agent is at least one member selected from the group consisting of vinylethoxysilane, 3-aminopropyltriethoxysilane, 3-glycidoxypropyltrimethoxysilane, 3-methacryloxypropyltrimethoxysilane, 3-mercaptopropyltrimethoxysilane, N-(1,3-dimethylbutylidene)-3(triethoxysilyl)-1-propanamine and N,N'-bis[3-(trimethoxysilyl)propyl]ethylenediamine.

* * * * *